April 7, 1931. T. KOBATAKE 1,799,377
HEAD LAMP LENS
Filed Feb. 18, 1929
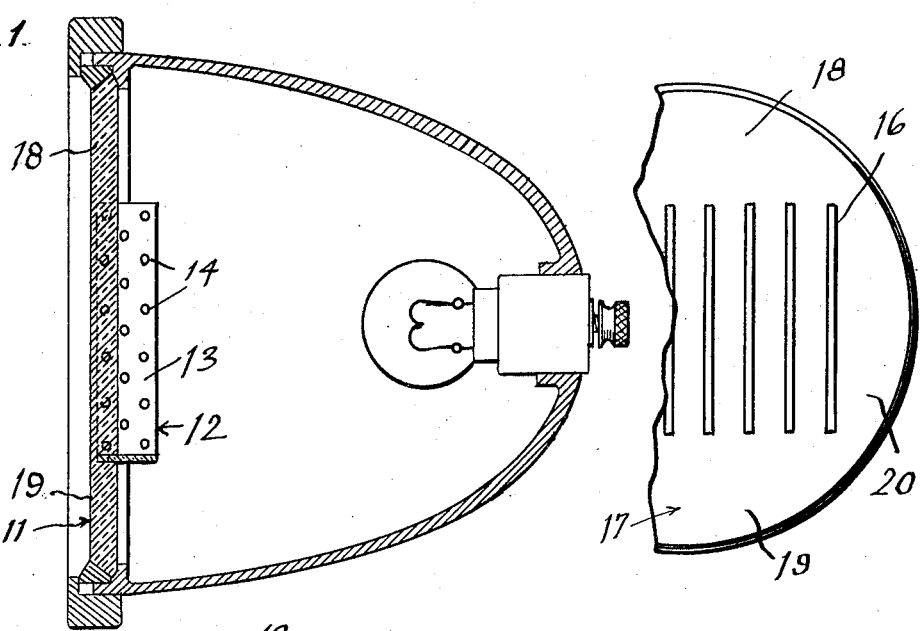
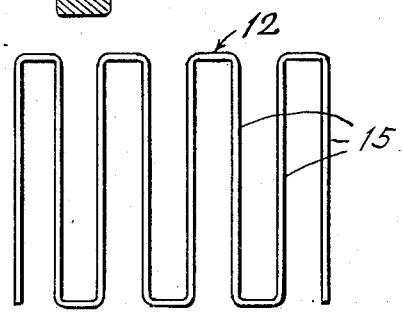
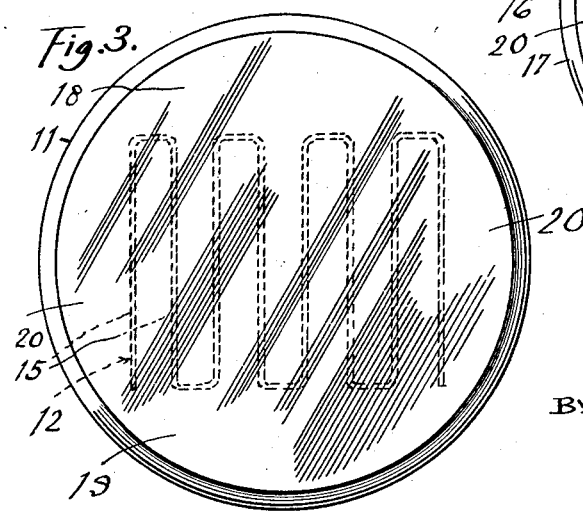
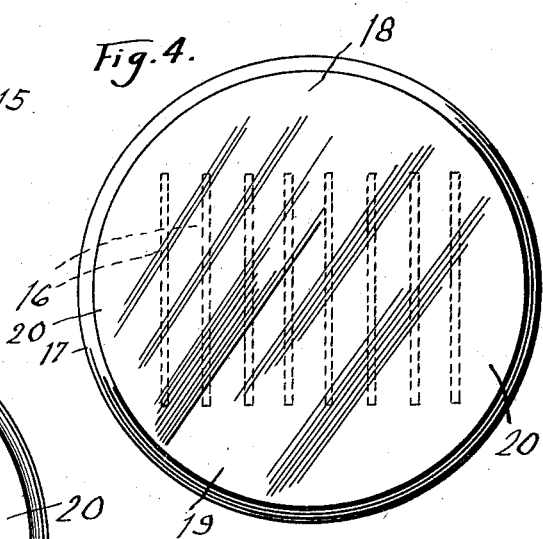
INVENTOR:
TSUNAJIRO KOBATAKE.
BY ATTY:

Patented Apr. 7, 1931

1,799,377

UNITED STATES PATENT OFFICE

TSUNAJIRO KOBATAKE, OF LOS ANGELES, CALIFORNIA

HEAD-LAMP LENS

Application filed February 18, 1929. Serial No. 340,879.

This invention relates to a lens for motor vehicle head lamps, or for any lamp which must provide certain illumination and avoid a glaring light.

Certain laws and ordinances prohibit the use of glaring and brilliant headlights on vehicles, and at the same time require certain illumination of the road or street for a distance ahead of the vehicle. Many attempts have been made to avoid these difficulties by dimming the lights, providing expensive lenses, by frosting, sanding, and coating the lens or light bulb with an opaque substance. These have proved more or less inefficient for the purpose intended.

The object of this invention is to embody a construction which will prevent an objectionable side glare, while giving full illumination ahead.

To produce a novel head lamp lens which will possess advantages in points of simplicity, efficiency and durability, and that will be inexpensive to manufacture, and that will accomplish the objects of this invention, I provide a plain or fancy, or ribbed lens as may be desired, and imbed therein a plurality of vertically arranged strips or plates, which are preferably of opaque material. These plates are spaced apart whereby the light bulb is visible only when viewed from a position directly in front of the head lamp, and whereby only reflected light may be seen when the lamp is viewed at an angle.

The invention consists in certain novel combinations and arrangements of parts as hereinafter specified and claimed. The drawings illustrate an embodiment of the invention according to the best mode which I have so far devised, but it is to be understood that I do not wish to be limited to the precise details of construction exhibited therein, but contemplate the employment of any modifications thereof that may fall within the scope of the invention and the appended claim.

In the drawings, Figure 1 is a sectional elevation of a head lamp having my improved lens mounted therein. Fig. 2 is a front and detail view of the shield element. Fig. 3 is a front view of the lens. Fig. 4 is a front view of a modified form of the invention. Fig. 5 is a fragmentary and rear elevation of the modified form.

In carrying out the invention, the lens 11, consists preferably of a plain glass element, and has imbedded therein the opaque shield 12, which has the projecting portion 13, on the rear of the lens, and which is provided with perforations 14. Shield 12, has rectangular convolutions 15, whereby the greater portion thereof is positioned vertically in the lens. The shield may have a greater number of convolutions, and may project from the rear of the lens more or less, all of which modifications fall within the scope of the invention.

In the modified form, the shielding filament consists of a number of vertically disposed plates 16, embedded in lens 17, and embodying the above described characteristics and modifications.

The lens may have a frosted or ribbed surface, which may be considered the equivalent of the plain lens, and the shield may be sheet metal, or any suitable material.

As may be seen by reference to Figs. 3 and 4, the shield is disposed in a substantially rectangular and central portion of the lens, allowing reflected light to be transmitted through the top portion 18, bottom portion 19, and side portions 20, of the lens.

When in use, the road or street will be illuminated ahead by the forwardly projected light, while being shielded by the shield or plates to protect the driver of an approaching vehicle, as only reflected light is seen when the head lamp is viewed at an angle relative to the axis of the lens.

The shield, if of silvered material, will intensify the deflected light, while side glare is eliminated.

What is claimed is:

A head lamp lens, comprising a lens body, and a perforated shield embedded therein, and projecting from the rear thereof, the shield having a plurality of vertically disposed convolutions.

In testimony whereof, I have hereunto affixed my signature.

TSUNAJIRO KOBATAKE.